US 6,456,945 B1

(12) United States Patent
Sonnichsen et al.

(10) Patent No.: US 6,456,945 B1
(45) Date of Patent: *Sep. 24, 2002

(54) DETECTING ANOMALIES IN ROTATING COMPONENTS

(75) Inventors: H. Eric Sonnichsen, Stow; Borislav Milatovic, Hudson, both of MA (US)

(73) Assignee: Test Devices, Inc., Hudson, MA (US)

( * ) Notice: Subject to any disclaimer, the term of this patent is extended or adjusted under 35 U.S.C. 154(b) by 116 days.

This patent is subject to a terminal disclaimer.

(21) Appl. No.: 09/609,778

(22) Filed: Jul. 5, 2000

Related U.S. Application Data

(63) Continuation-in-part of application No. 08/953,259, filed on Oct. 17, 1997, now Pat. No. 6,098,022.

(51) Int. Cl.[7] .......................... G01M 1/16; G06F 19/00
(52) U.S. Cl. ..................... 702/56; 702/35; 702/190; 73/460; 73/462
(58) Field of Search ........................ 702/56, 35, 190, 702/81, 33, 41, 189; 73/460, 462, 570

(56) References Cited

U.S. PATENT DOCUMENTS

| | | | |
|---|---|---|---|
| 4,213,346 A | 7/1980 | Polovnikov et al. | 73/660 |
| 4,380,172 A | 4/1983 | Imam et al. | 73/659 |
| 4,408,294 A | 10/1983 | Imam | 365/508 |
| 4,426,641 A | 1/1984 | Kurihara et al. | 340/683 |
| 4,453,407 A | 6/1984 | Sato et al. | 73/462 |
| 4,488,240 A | 12/1984 | Kapadia et al. | 364/508 |
| 4,635,210 A | 1/1987 | Shiohata et al. | 364/508 |
| 4,751,657 A | 6/1988 | Imam et al. | 364/508 |
| 4,988,979 A | 1/1991 | Sasaki et al. | 340/683 |
| 5,258,923 A | 11/1993 | Imam et al. | 364/508 |
| 5,412,583 A | 5/1995 | Cameron et al. | 702/56 |
| 5,412,985 A | 5/1995 | Garcia et al. | 73/460 |
| 5,533,400 A | 7/1996 | Gasch et al. | 73/593 |
| 5,635,642 A | 6/1997 | Nonomura et al. | 73/504.16 |

FOREIGN PATENT DOCUMENTS

| | | |
|---|---|---|
| DE | 40 32 299 A1 | 4/1992 |
| DE | 44 06 723 A1 | 9/1994 |
| GB | 2 248 110 A | 3/1992 |

*Primary Examiner*—John S. Hilten
*Assistant Examiner*—Hien Vo
(74) *Attorney, Agent, or Firm*—Hamilton, Brook, Smith & Reynolds, P.C.

(57) ABSTRACT

A method for detecting an anomaly, such as a crack, in a rotor includes measuring the rotational speed and vibration of the rotor. A vibration signal synchronous with the frequency of rotation is filtered from the vibration measurement. A background vibration vector is then subtracted from the synchronous vibration signal to produce a vibration difference signal. The phase and amplitude of the vibration difference signal are measured and evaluated to determine whether an anomaly has developed. An apparatus for performing this method includes vibration and speed sensors coupled to a filter for extracting a signal from the vibration measurement having a frequency synchronous with the rotation of the rotor. A processor is coupled to the filter and the speed sensor and is programmed to perform the processing steps, described above.

21 Claims, 6 Drawing Sheets

DETECTING ANOMALIES IN ROTATING COMPONENTS

RELATED APPLICATION(S)

This application is a continuation in part of U.S. Ser. No. 08/953,259, filed Oct. 17, 1997, and now U.S. Pat. No. 6,098,022, the entire contents of which are incorporated herein by reference.

BACKGROUND OF THE INVENTION

Rotating components used in jet engines and other high-speed machineries operate under large centrifugal stresses and can be fatigued through repeated use. For example, the Federal Aviation Administration (FAA) requires testing of newly-designed and revised engine hardware to establish life expectancy during the development phase of a new engine, and also when significant changes are made to an engine design.

Most jet engine manufacturers spend substantial time and money on computer simulations ("finite element models" of the engine hardware) to obtain an initial estimate of the safe operating life of an engine part. It is impossible, however, to determine a rotor's actual characteristics until it has been built and tested. Centrifugal fatigue life is generally measured at a centrifugal stress testing facility, in a spin test system designed to cycle the rotor from some low speed to operational speed then back again, alternately applying and relaxing the centrifugal stress.

Jet engines have numerous rotating parts that move and compress air (fans and impellers), or produce work (turbines). The elevated speeds at which these parts rotate induce high levels of centrifugal stress that tend to pull the components apart. A jet engine part such as a rotor usually fails in one of two ways. In the first failure mode, the rotor rotates to a speed that is sufficient to cause catastrophic material failure or burst. However, even when a rotor rotates at less than its burst speed, the rotor may eventually weaken over time as a result of many starts and stops. In this second failure mode, the part fatigues to a point where it develops a crack, which then grows to a critical size and ultimately causes the part to fail.

Typically, jet engine components such as rotors are thoroughly tested by the manufacturer as part of a development and qualification process to establish a safe operating life. The manufacturer will generally use a type of spin testing known as "fatigue life" testing. Fatigue life is measured in cycles, with a run up to operating speed and back down to zero or some lower speed being counted as one cycle. Each cycle corresponds roughly to one takeoff and landing of an aircraft. After the designer has measured the number of cycles a part can withstand before a fatigue burst happens, safety and performance factors can be developed and applied. The safety factor determines how many cycles can be tolerated by an engine before a part must be replaced. The safety margin is established cooperatively by the engine manufacturer and the appropriate governing safety authority, and it is intended to assure that parts are replaced before there is any chance of burst in the engine.

Jet engine rotors are also routinely subject to periodic inspection after installation to determine the health of the rotor. To inspect an installed rotor, the engine is taken apart and the rotor is immersed in a fluorescent penetrant. The fluorescent penetrant will penetrate any cracks in the rotor and thereby facilitate their detection under ultraviolet light.

Moreover, methods are known for evaluating the health of a rotor by electronically monitoring vibrations. These methods generally require that the rotor be operated at a fixed speed to acquire information that will allow the phase angle of a crack to be determined. In one example, a method disclosed in U.S. Pat. No. 4,751,657, issued to Imam et al., requires that the engine rotor be held at several different speeds for successive measurements during engine run-up.

Establishing safe operating component lives is a critically important process, since the fragments of a bursting rotor cannot be contained by the engine casing. A rotor burst in flight would probably destroy the aircraft. The air transport industry has achieved its admirable safety record due in no small way to spin-pit life testing of engine parts; still, there have been some tragic accidents in air transport due to rotor burst. Examples of accidents traced to fatigue failure include the DC-10 crash at Sioux City; the in-flight separation of a propeller blade in the crash of an EMB-120 Embraer near Carrollton, Ga.; and the most recent fatal explosion of a fan disk assembly during take off of an MD-80 in Florida.

There is, therefore, still an unmet need for a technique which can accurately detect fatigue, cracks, and other anomalies in rotating components such as jet engine rotors and which is less cumbersome to use than fluorescent immersion or even electronic instruments that require controlled engine speed runs. Ideally, the technique could be used in a spin testing instrument used during engine design as well as for inflight instrumentation which might continuously monitor the health of a jet engine.

SUMMARY OF THE INVENTION

Described herein is a system for monitoring a rotor, such as a rotor in an operating jet engine, to detect cracks or other potentially hazardous conditions. The system can be used with great accuracy and sensitivity both to test a part in a centrifugal spin test facility as well as to test a part, in situ, during standard operation. Use of this system on an operating jet engine, or other machinery, can greatly reduce the risk of accidents, such as those described, above.

The system, itself, includes a vibration sensor for measuring the vibration of a rotor, a speed sensor for measuring the rotational speed of the rotor, a filter coupled to both the speed sensor and vibration sensor, and a signal processor coupled to the filter and speed sensor. The filter, which can be a digital filter, extracts a signal from the vibration measurement having a frequency synchronous with the rotation of the rotor. The processor is programmed to subtract a background (or baseline) vibration vector from the synchronous vibration signal to produce a vibration difference signal. The processor then measures and evaluates the amplitude, and preferably also the phase, of the vibration difference signal to determine if an anomaly, such as a crack, has developed.

In a preferred embodiment, the processor is programmed to evaluate the vibration difference signal by comparing it with the phase of a previous vibration difference signal to determine if the phases are consistent. The processor then subtracts a baseline vibration vector from the synchronous vibration signal and evaluates the difference to determine whether the difference exceeds a preset triggering limit. A crack is detected when the phase remains consistent and the difference between the synchronous vibration signal and the baseline vibration vector is greater than a triggering limit.

In a further preferred embodiment of the system, the rotor is a component of a jet engine on an aircraft.

A method of this invention may be broken down, as follows. The rotational speed and vibration of a rotor are measured. From the vibration measurement, a synchronous vibration signal having a frequency matching the frequency of rotation is filtered. A baseline vibration vector is subtracted from the synchronous vibration signal to produce a vibration difference signal. The amplitude, and preferably also the phase, of the vibration difference signal is then measured and evaluated to determine whether an anomaly, such as a crack, has developed. In a preferred embodiment of the method, the steps of the above-described method are repeated and vibration is measured while the rotor is accelerating or decelerating.

In another embodiment of the method of the invention, a mechanical component is rotated about an axis at a range of rotating speeds. A vibration signal value of the mechanical component is detected while the mechanical component is rotating. This vibration signal value is detected independently of whether, or at what rate, the mechanical component is accelerating or decelerating.

DETAILED DESCRIPTION OF PREFERRED EMBODIMENTS

Figure 1A:
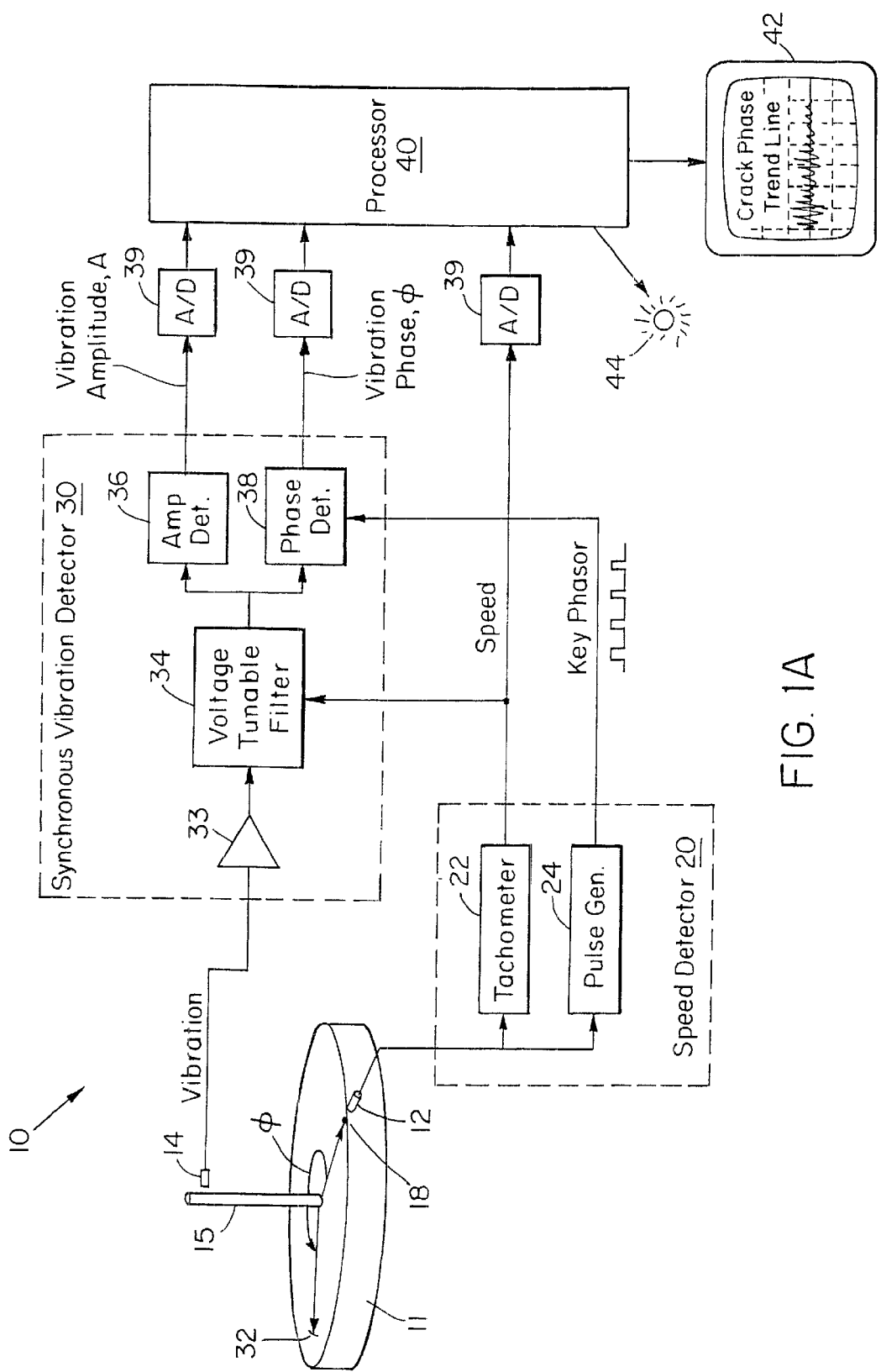
FIG. 1A is a block diagram of the components of one embodiment of a system for monitoring a rotor

FIG. 1A is a block diagram of the components of a system for detecting attributes of anomalies 32 such as cracks formed in a rotating component 11. The system 10 includes a reference signal transducer 12, a vibration transducer 14, a speed detector 222, a synchronous vibration detector 30, one or more analog to digital (A/D) converter 39, a processor 40, a display 42 and an indicator 44.

The rotating component 11 may be a rotor of a jet engine, which may include a turbine blade, a flywheel, or other mechanical component subject to fatigue, cracks, and other anomalies which eventually lead to catastrophic failure.

The reference signal transducer 12 is positioned in radial alignment with a circumferential surface of the rotating component 11 or other component of the rotating assembly. The reference signal transducer 12 is typically a variable reluctance sensor probe such as model M3010 manufactured by Electro Corporation of Sarasota, Fla. The output of the reference signal transducer 12 is provided to a tachometer 22 and pulse generator 24.

The tachometer 22 operates on the signal provided by the reference signal transducer 12, monitoring it over time to determine the rotational speed of the component 11 such as measured in revolutions per minute. The tachometer 22 then generates a speed signal that is forwarded to the synchronous vibration detector 30 and analog to digital converter 39. A tachometer 22 suitable for use in this application is the model 1150 manufactured by Test Devices, Inc. of Hudson, Mass.

The pulse generator 24 provides a short duration pulse signal having a rising edge at precisely the same point of each revolution of the component 11. The pulses generated form a key phasor signal having a rising edge each time that a reference point 18 of the component 11 passes by the reference signal transducer 12. The key phasor signal is therefore a series of pulses indicating at points in time which the component 11 is at a known position. The key phasor signal is provided to the phase detector and also provided to the synchronous vibration detector 30.

The vibration transducer 14 is radially aligned with the axis of rotation of the component 11 such as its central shaft 15. The vibration transducer 14 is typically an eddy current type probe which generates a continuous voltage indicative of a vibration measurement. One suitable vibration transducer 15 is the model number VM-14S1 manufactured by Shinkawa Electric Co., Ltd. of Chicago, Ill. and associated VK202A-2 transducer driver. However, if a rotor is monitored while in normal use, the central shaft may not be accessible. Under these circumstances, force upon the bearing casing can be measured using an accelerometer to indicate vibration. The raw vibration signal produced by the vibration transducer 14 is provided to the synchronous vibration detector 30.

The synchronous vibration detector 30 includes a pre-amplifier 33, a voltage tunable filter 34, an amplitude detector 36, and a phase detector 38. The synchronous vibration detector 30 operates on the vibration signal, speed signal, and key phasor to provide a vibration vector in the form of vibration amplitude signal and a vibration phase signal.

More particularly, the pre-amplifier 33 provides appropriate buffering of the signal output by the vibration transducer 14 prior to forwarding it to the voltage tunable filter 34.

The voltage tunable filter 34 receives the vibration signal as well as the speed signal to selectively extract certain components of the vibration signal. The signal components extracted are those which are synchronized with the instantaneous rotating frequency of the component 11. Other components of the vibration signal are rejected by the voltage tunable filter 34. In other words, the voltage tunable filter 34 selects only those vibrations with frequencies matching the instantaneous frequency of rotation of the component 11 for further processing. The voltage tunable filter 34 may, for example, be a model number FLJ-VD bandpass filter available from Datel, Inc. of Mansfield, Mass. In effect, the voltage tunable filter acts as a bandpass filter to select only the components of the vibration signal equal to the current rotation speed frequencies as indicated by the tachometer 22.

As a result of the operation of the voltage tunable filter 34, the system 10 provides an advantage over similar prior art systems in that it is able to measure the growth of anomalies 32 such as cracks and migration in their position while the rotating component 11 is operating in any mode, and not just at a constant rotational speed. As a result, the normal operation of a machine under test, such as a jet engine, need not be interrupted to perform an evaluation of the relative health of the component 11. Rather, the initiation of a crack or other anomaly 32 may be detected and its growth observed even while component 11 is under normal operation, or even when cycled under high rates of acceleration and deceleration during a test mode in a spin pit.

The output of the voltage tunable filter 34 is thus an analog voltage indicative of the vibration signal components at the current speed.

This synchronously filtered vibration signal is then forwarded to the amplitude detector 36 and phase detector 38. The filtered vibration signal at this point is typically a sinusoidal waveform where its amplitude represents the amplitude of the synchronous vibration of the component 11, and where in phase is a relative measurement of the angular location of the vibration anomaly relative to the reference point 18.

Therefore, the amplitude detector 36 processes the filtered vibration signal by an amplitude measuring circuit that provides a direct current (DC) voltage proportional to the amplitude.

The filtered vibration signal is processed at the same time by the phase detector circuit 38, which compares the phase of the filtered vibration signal to the key phasor signal, in order to develop a voltage output indicative of the angular location, $\phi$, of the anomaly 32. The phase detector circuit 38 thus provides an accurate indication of the relationship between the phase of the filtered vibration signal and the reference signal provided by the transducer 12.

The output of the synchronous vibration detector 30 is thus a pair of DC voltages representing the vector amplitude and phase of the filtered synchronous vibration, in real time, of the component 11.

The vibration amplitude voltage, A, and vibration phase voltage, $\phi$, are fed together with the speed voltage to the A/D converters 39. Each of these voltages may be processed by respective A/D converter 39 or a single A/D converter 39 may be time-multiplexed among the three signals.

The converted analog voltages are then provided to the processor 40. The processor 40 performs a number of steps in order to further discern speed-dependent changes in the vibration measurements. In particular, the processor 40 acts as a form of sample and hold device that ensures that vibration amplitude and phase is acquired at the same speed of rotation of the component 11, such as when it crosses through desired triggering speed in a given operating cycle. In a jet engine, for example, the speed of a rotor component 11 may cross a triggering speed each time the aircraft takes off and lands, accelerating through the former and decelerating through the latter.

The processor 40 preferably takes advantage of the fact that the vibration amplitude A and vibration phase $\phi$ can be mathematically expressed as a vector. By recording this vector during a baseline measurement process and then comparing subsequently measured vectors during cycling of the component 11, a difference vector may be developed which represents actual change in vibration due to the presence of later developed anomalies 32. The baseline measurement is typically taken while the component 11 is in a known state, such as when it is new and having no known anomalies. Once this difference vector differs in magnitude or phase, or exhibits other changed characteristics, the processor 40 may provide an indication via the display 42 or other indicator 44 of either the history of the vibrations due to the anomaly 32 and/or an indication that the component 11 is entering a critical state prior to failure.

Figure 1B:
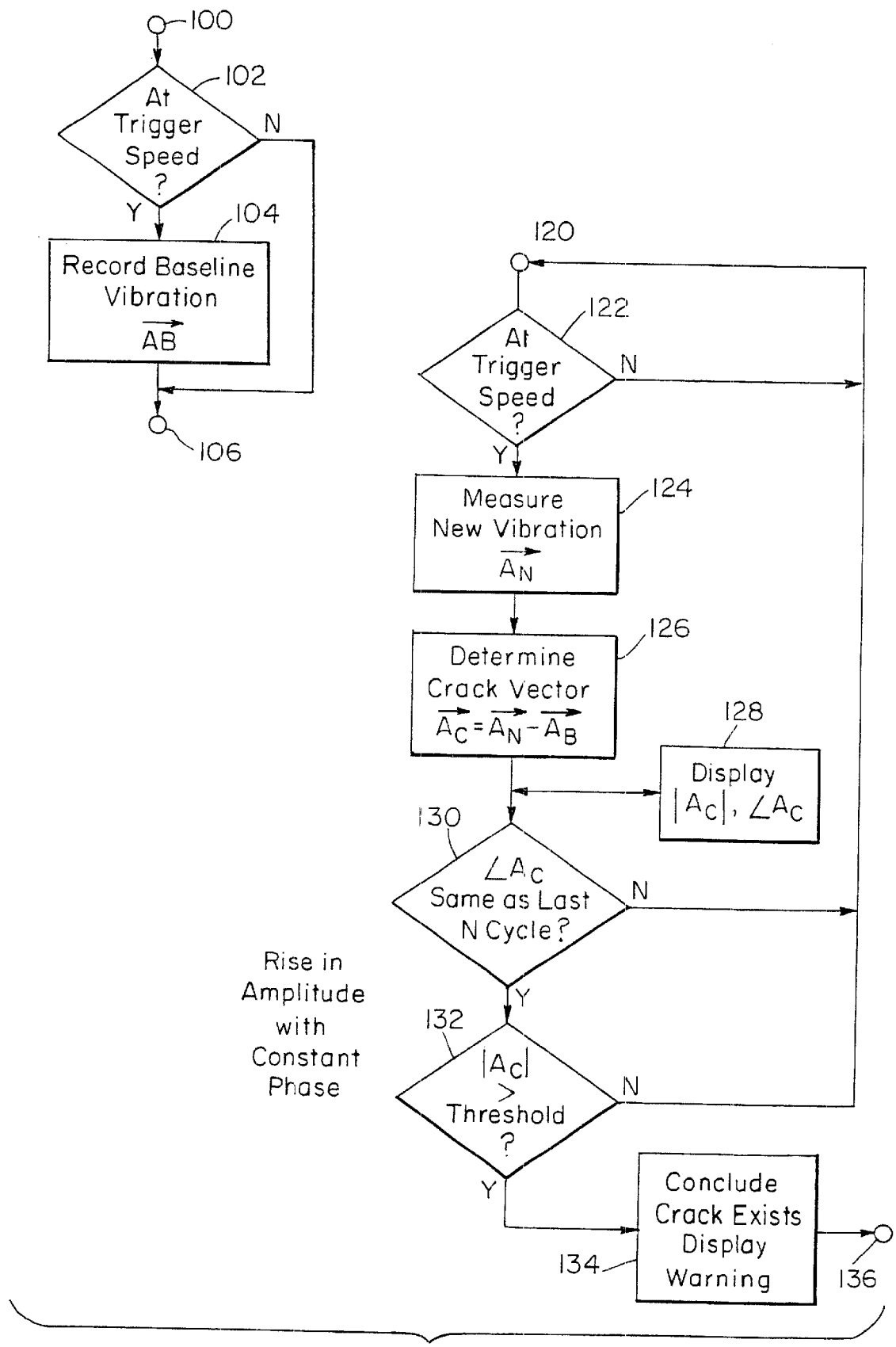
FIG. 1B is a flow chart of the sequence of steps performed by the processor shown in FIG. 1A.

The sequence of these steps as performed by the processor 40 is detailed in FIG. 1B. From an idle or otherwise unrelated operating state 100, the processor 40 enters a state 102. State 102 is typically entered during a calibration or baseline sequencing for the device 11 such as during initial installation or at another time when the component 11 is known to be in known good condition. In state 102, the speed value as provided by the tachometer 22 and A/D converter 39 is compared against a trigger speed. If the speed of the component 11 is not at the trigger speed, that is it is either rotating at a slower speed or a faster speed, then processing continues to a later state 106. However, if the speed is at the trigger speed, then a state 104 is entered in which a baseline vibration vector $A_B$ is recorded. The vector $A_B$ records the vibration amplitude A and vibration phase $\phi$ observed at the trigger speed. Processing then continues to state 106 in which the processor 40 may perform other tasks.

The processor eventually reaches a state 120 such as performed during a test sequence or during normal operation of the component 11 such as during a takeoff or landing of the aircraft. From the state 120 a state 122 is entered in which the speed signal is again measured to determine if it is at the trigger speed. If this is not the case, then processing returns to 120 where the processor 40 may perform other tasks.

If, however, the component 11 is presently rotating at the trigger speed, then a state 124 is entered. In this state a new vibration vector $A_N$ is determined by again measuring the vibration amplitude, A, and vibration phase, $\phi$.

Processing then proceeds to the next step 126 in which a crack vector $A_C$ is determined from the relationship:

$$A_C = A_N - A_B$$

The crack vector, $A_C$, therefore represents the difference between the most recently measured vibration at the trigger speed and the baseline vibration. This vector difference therefore represents only the amount of vibration produced by the anomaly 32 (referred to herein as the anomaly vibration).

The processor 40 may then perform a number of steps to permit further evaluation of the anomaly vibration in a number of ways. For example, the processor 40 may enter a state 128 in which a display of the amplitude and phase of the crack vector $A_C$ is presented typically on a per cycle basis. This display may be provided on a visual output device such as a cathode ray tube display 42, a printer, or other output device.

Alternatively or additionally, processor 40 may proceed to a state 130 in which the processor compares the value of consecutive crack vector phase measurements to determine if the phase is remaining relatively consistent. If this crack vector phase has remained consistent over a series, such as N, prior cycles, then this is an indication of an anomaly 32 developing. If, however, this phase difference is not the same over a series of prior measurements then it is presumed that any such differences are noise, and defined anomalies are not occurring. Therefore, processing may continue back to state 120.

Once a constant phase of the crack vector $A_C$ has been observed then a state 132 is entered in which the amplitude portion of the anomaly vibration vector is determined. If this amplitude is not greater than a threshold amount, indicating an acceptable condition, processing returns to state 120.

If, however, a crack has developed in the rotating component 11, a significant distortion of the symmetry of the strain field in the device produces a proportional change in the mass distribution, therefore unbalancing it in measurable way. This is indicated by the amplitude of the vector $A_C$ exceeding a predetermined threshold.

In this instance, a state 134 is entered in which it is concluded that a crack or other anomaly 32 exists. At this point the presence of the anomaly 32 may be announced by activating an indicator 44. If associated with a device under test such as a jet engine, the indicator 44 may be provided in an engine compartment such as in a position to be noticed the next time the aircraft lands for servicing in other applications the indication may be provided on a display to an operator of the aircraft.

The processor then returns to a state 136 in which further processing relevant to having detected an unacceptable level of anomaly 32 in the rotating component 11. For example, the processor 40 at this point may provide other signals to a drive shaft of the component 11 to halt its rotation.

We have determined that the principles of the foregoing system hold true for a variety of different type of anomalies 32. For example rim, bore and blade cracks of a jet engine rotor each produce measurable imbalance changes. Rim cracks produce less distortion of mass distribution but are located at a relatively large radius and therefore produce significant imbalance. Bore cracks on the other hand are typically located at a small radius. However, because of relatively high stress in a bore crack, the bore cracks produce very significant mass distribution changes. Blade cracks often produce a small crack amplitude rating compared to rim and bore cracks but their phase indication is definitive.

The crack induced redistribution of the mass of the rotating component 11 therefore causes an anomaly vibration that can be synchronously detected as described above. Because the amplitude of the anomaly vibration increases as the crack develops, the existence of any of various types of cracks can be detected by monitoring the amplitude of the anomaly of the vibration and/or its phase, even during normal acceleration and deceleration cycling of the component 11.

Figure 1C:
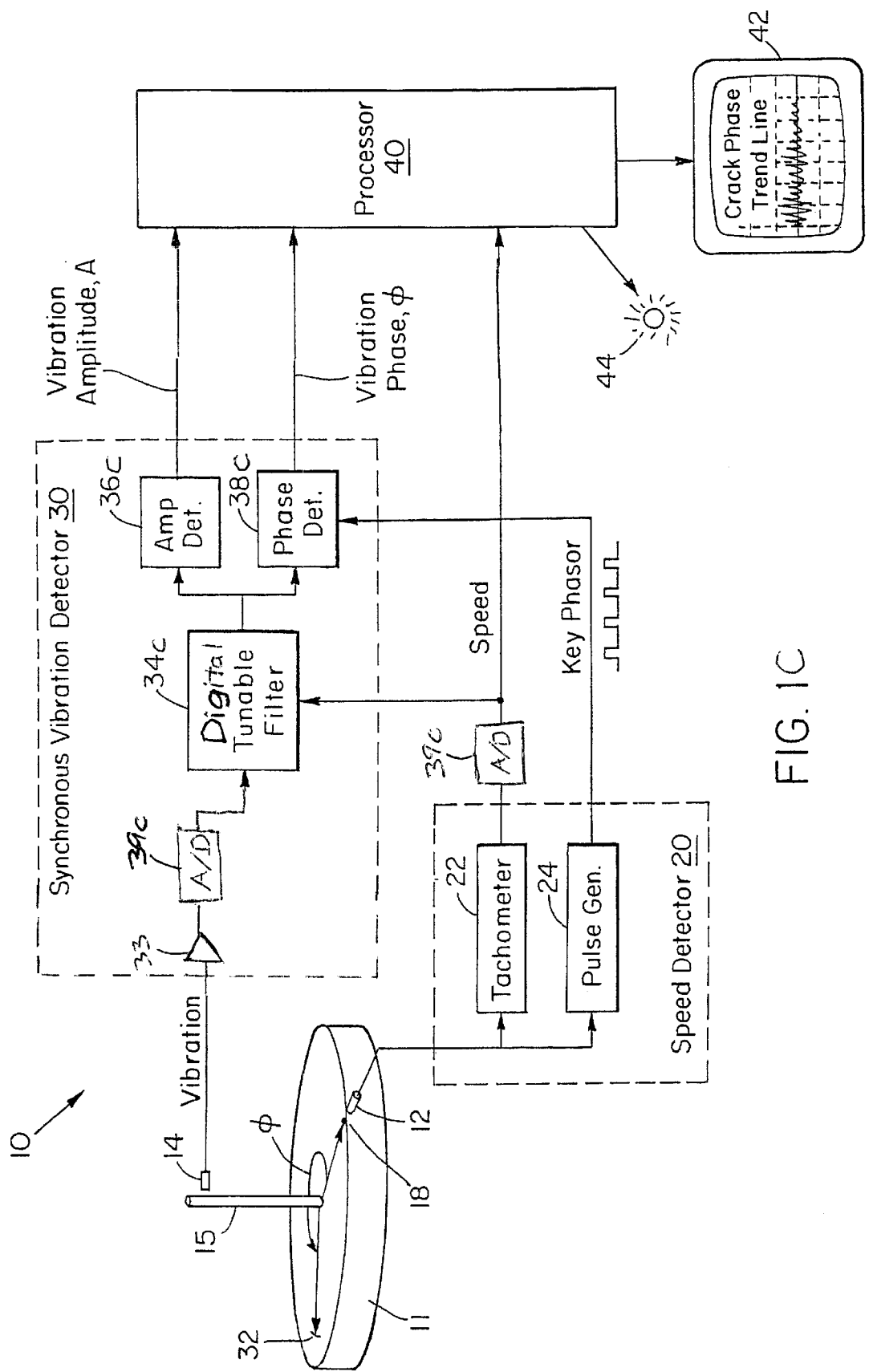
FIG. 1C is a block diagram of an alternative embodiment of a system for monitoring a rotor.
Figure 2:
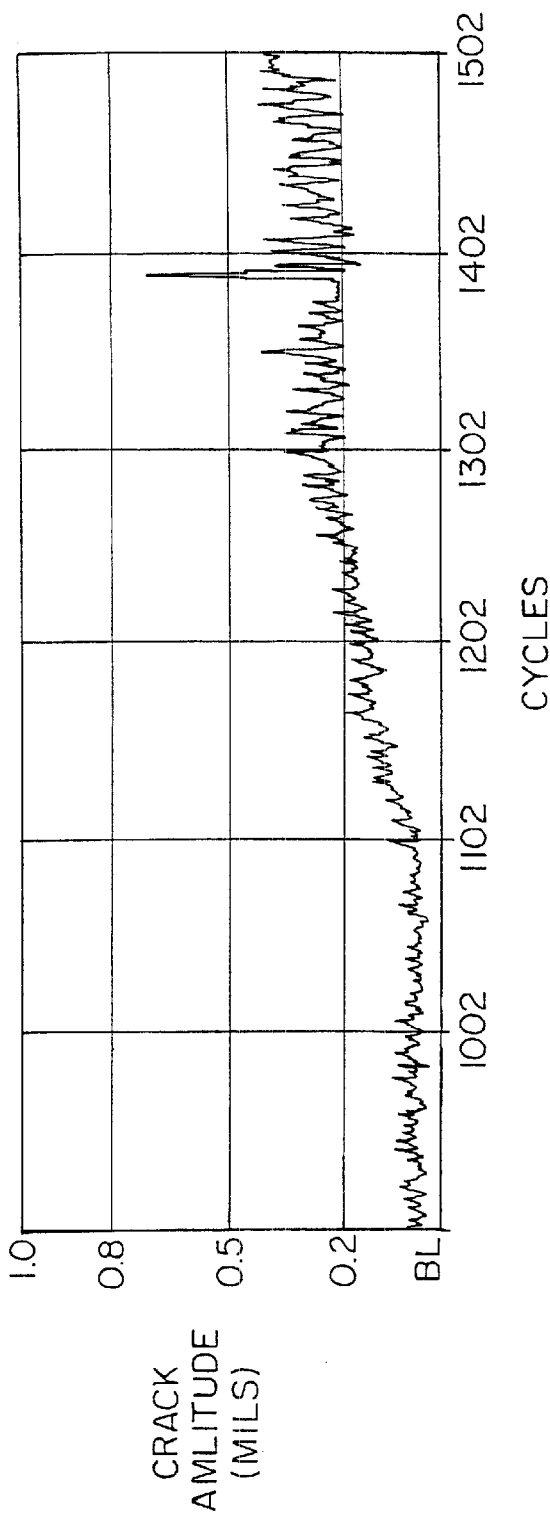
FIG. 2 is a graph of crack amplitude in a rotor versus cycle, as described in the exemplification entitled, "Example I," infra.
Figure 3:
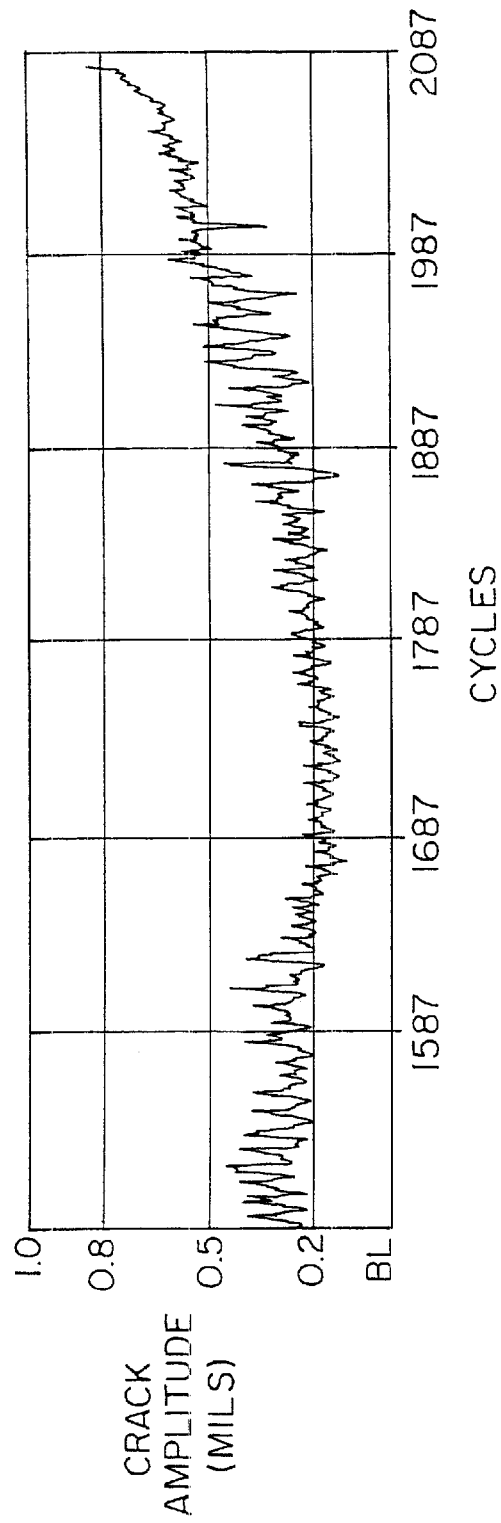
FIG. 3 is a graph of crack amplitude over the final cycles of the test charted in FIG. 2.
Figure 4:
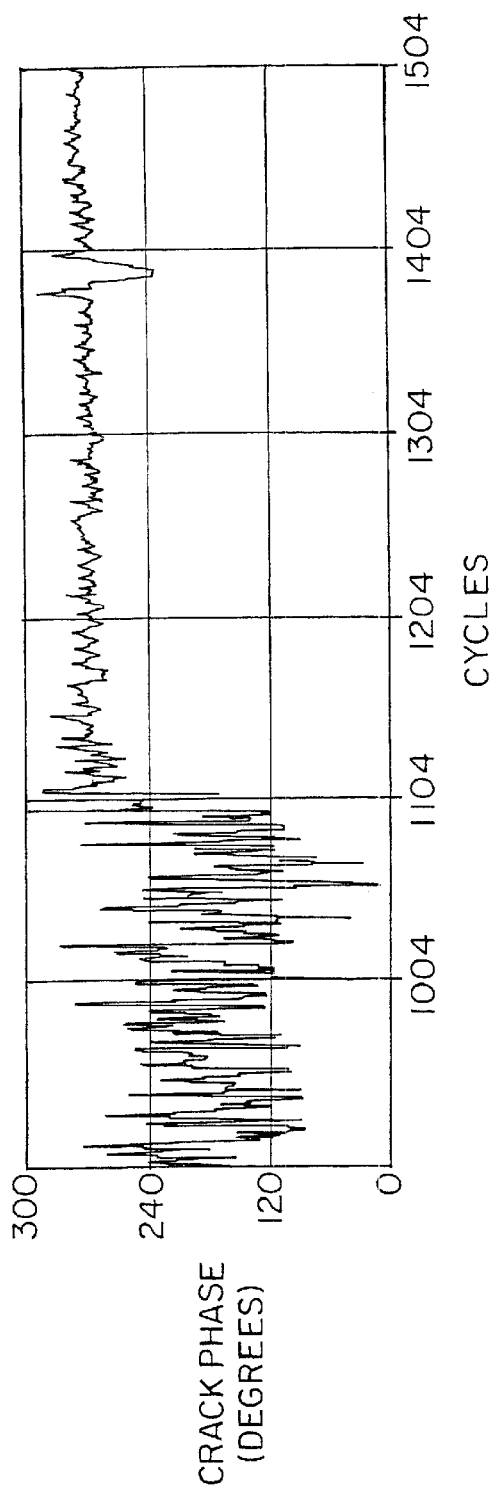
FIG. 4 is a graph of crack phase corresponding to the measurements charted in FIG. 2.
Figure 5:
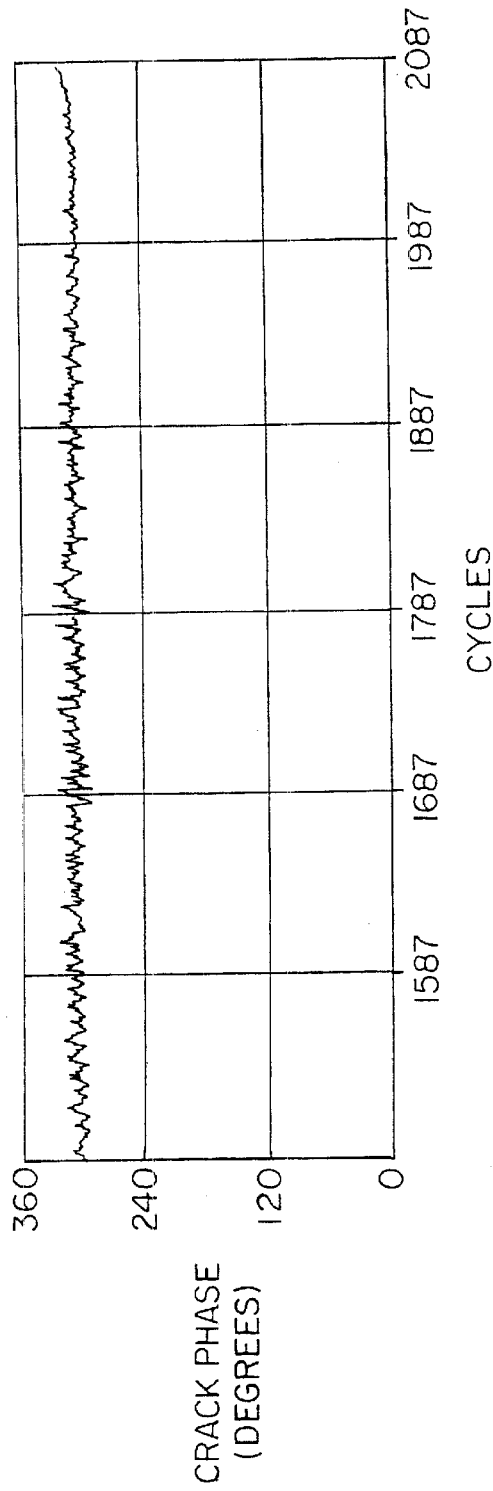
FIG. 5 is a graph of crack phase corresponding to the measurements charted in FIG. 3.

FIG. 1C is a block diagram of an alternate embodiment of the synchronous vibration detector 30. This embodiment makes use of a digital filter to perform the function of the voltage tuneable filter 34 in the embodiment previously described in FIG. 1A. In particular, the vibration signal is still fed to an amplifier 33. However, in this embodiment, the vibration signal is first converted to a digital signal by the A/D converter 39c. This digital vibration signal is then fed to a digital filter 34c, having its center frequency tuneable by the speed signal. The digital tuneable filter 34c provides digital filtered signal to the amplitude detector 36c and phase detector 38c. Of course, in this embodiment, the amplitude detector 36c and phase detector 38c are also digital circuits.

The key phasor signal is also fed to the phase detector 38c as in the previously described analog embodiment. The output of this embodiment of the synchronous vibration detector 30 is fed to the processor 40 as in the FIG. 1A embodiment previously described. It should be understood that the digital tuneable filter 34c can be implemented using any number of known techniques for implementing digital filters. For example, it may be implemented as a finite impulse response (FIR) type digital filter or using fast Fourier transforms (FFTs) or other known digital filtering techniques.

EXEMPLIFICATION

The performance of the crack detection system has been demonstrated in many different testing applications. Without exception the system has given excellent results with various rotating part configurations and with different materials, including both metals and composites. The system has successfully detected cracks and crack propagation on carbon fiber composites used for energy storage flywheels, on bladed turbine assemblies, a second stage compressor rotor for a jet engine, a bladed fan disk, medical centrifuiges, and numerous other rotors.

Example I
High-Pressure Turbine (Bladed Disk Assembly)

An example application is shown in FIGS. 2–5. This was a low-cycle fatigue test for life certification of a bladed turbine assembly for a jet engine gas generator. The disk was about eight inches in diameter and weighed 15 pounds (lbs.). The test specification called for 30,000 cycles between minimum and maximum speeds of 2,500 revolutions per minute (RPM) and 48,000 RPM. The crack detection system monitored the vibration and crack development. Through 25,000 cycles (1100 on FIG. 2), the system indicated an insignificant crack amplitude, and the crack phase was random (see FIG. 4), a clear indication that no crack has been detected. Beyond 25,000 cycles the initiation of a crack is indicated, as demonstrated by the trend of the crack amplitude (see FIGS. 2 & 3) and crack phase curves (see FIGS. 4 & 5).

As the amplitude of the crack grew, the phase stabilized around a particular angle. During the next 1000 cycles the crack propagation continued, confirmed by the crack amplitude and phase stability trend. At 25,987 cycles (2087 on the graph in FIG. 3), the crack amplitude grew to 0.83 mils, which exceeded the alarm level set at 0.8 mils, and shut down the test (note: the crack amplitude is a relative indication of crack size compared to a previously set baseline, not an absolute indication). The alarm level was reset and the test was continued. The next cycle indicated 0.96 mils of crack amplitude, and the disk burst on the following cycle.

In this test, the crack detection system successfully detected and tracked the primary crack in this rotor for the last 990 cycles. In the next example the system detects and tracks a series of cracks in another bladed disk assembly for more than 17,000 cycles.

Example II
Power Turbine (Bladed Disk Assembly)

In this example, a low-cycle fatigue test was performed on a series of power turbine disks. The test was performed in a degraded vacuum which eliminated fretting as an issue during the spin test. A number of tests were run and different failures were recorded and observed with the crack detection system as discussed below.

Figure 6:
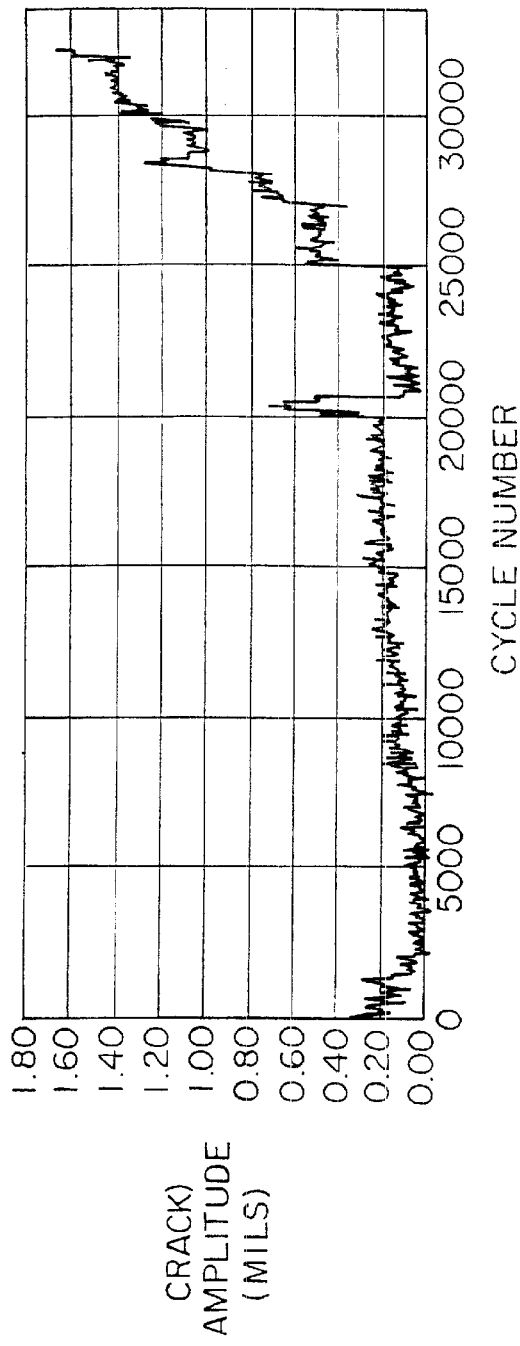
FIG. 6 is a graph of crack amplitude versus cycle, as described in the exemplification entitled, "Example II," infra.
Figure 7:
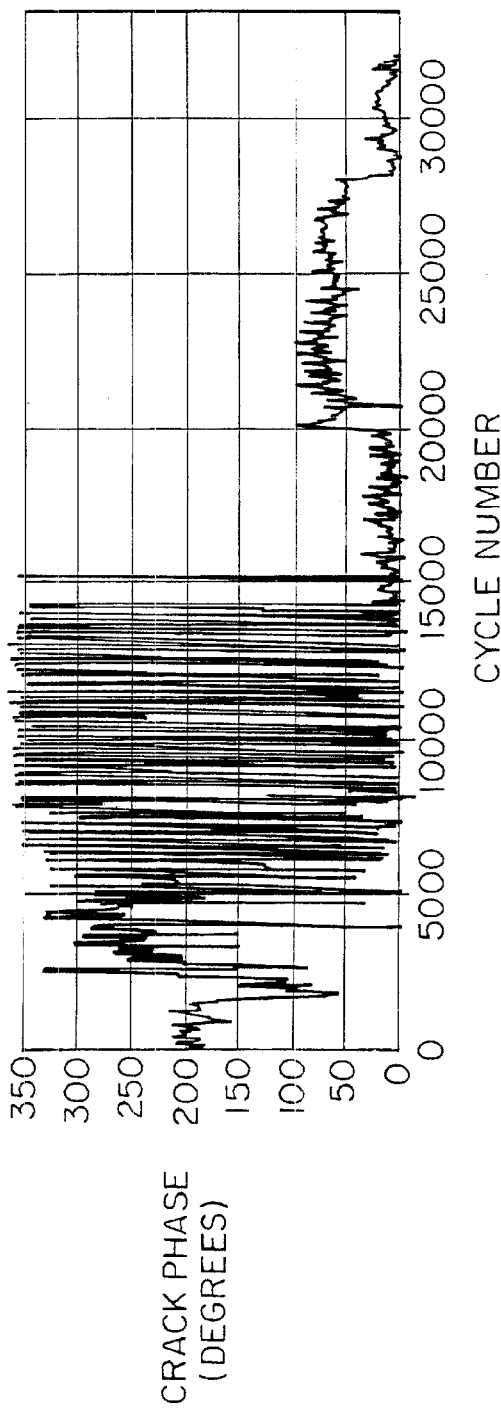
FIG. 7 is a graph of crack phase corresponding to the measurements charted in FIG. 6.

FIG. 6 is a plot of crack amplitude for one of the power turbine disks. This disk developed cracks in blade tenons. At test termination (approximately 32,000 cycles) this disk had 16 cracks approximately 0.200 inches in size. The crack detection system successfully picked up the initial crack and was able to track crack growth through multiple crack initiations for more than 17,000 low-cycle-fatigue cycles. FIG. 7 shows the phase plot of the crack detection system for this test. It is clear from the undulations in the graph that past cycle 15,000 the system is tracking multiple cracks, growing at different rates.

EQUIVALENTS

While this invention has been particularly shown and described with references to preferred embodiments thereof, it will be understood by those skilled in the art that various changes in form and details may be made therein without departing from the scope of the invention as defined by the appended claims. For example, the apparatus and method can be used to detect not only cracks within the structure, but also other mechanical anomalies, such as a loose bolt within the structure. Although much of the description is directed toward the testing of jet engine rotors, the method and apparatus of this invention can also be used to monitor other rotating machinery, such as energy-storage flywheels, turbines for power generation and medical centrifuges.

The invention claimed is:

1. A method for detecting an anomaly in a rotor, comprising the steps of:
   a) measuring rotational speed of the rotor;
   b) converting the measured rotational speed to a digital rotational speed signal;
   c) measuring vibration of the rotor, the vibration having an amplitude and phase that can be expressed as a vibration vector value;
   d) converting the measured rotor vibration to a digital rotor vibration signal;
   e) filtering the digital rotor vibration signal with a digital filter to provide a synchronous vibration signal having a frequency equal to the frequency of rotation;
   f) storing a baseline vector value corresponding to the vibration vector value at a first time;
   g) measuring a new vector value corresponding to the vibration vector value at a second time;
   h) generating a vibration difference signal based on the difference between the baseline vector value and the new vector value;
   i) measuring amplitude of the vibration difference signal; and
   j) evaluating the amplitude of the vibration difference signal to determine whether an anomaly has developed.

2. The method of claim 1, further comprising the steps of
   k) measuring phase of the vibration difference signal; and
   l) evaluating the phase of the vibration difference signal to determine whether an anomaly has developed.

3. The method of claim 2, further comprising the repetition of steps (g)–(j).

4. The method of claim 3, wherein the phase of the synchronous vibration signal is evaluated by comparing it with a phase of a previous vibration signal to determine if the phases are consistent.

5. The method of claim 4, wherein vibration is measured while the rotor is accelerating.

6. The method of claim 4, wherein vibration is measured while the rotor is decelerating.

7. The method of claim 2, wherein the rotor is a rotating part in a jet engine and each of steps (a) and (c) are performed when the jet engine is propelling an aircraft.

8. The method of claim 7, wherein each of steps (b) and (d) through (j) are performed when the jet engine is propelling an aircraft.

9. An apparatus for detecting an anomaly in machinery having a rotor, comprising:
   a) a vibration sensor for measuring vibration of the rotor and for generating a vibration signal;
   b) an analog-to-digital converter coupled to receive the vibration signal from the vibration sensor and to convert the vibration signal to a digital vibration signal;
   c) a speed sensor for measuring the rotational speed of the rotor and for generating a speed signal;
   d) an analog-to-digital converter coupled to receive the speed signal from the speed sensor and to convert the speed signal to a digital speed signal;
   e) a digital filter coupled to receive the digital vibration signal and to receive the digital speed signal, wherein the digital filter extracts a signal from the digital vibration signal having signal components synchronous with the rotation of the rotor;
   f) a medium for storing a background vibration vector; and
   g) a processor coupled to the filter, the speed sensor and the medium, wherein the processor is programmed to subtract the background vibration vector from the synchronous vibration signal and to produce a vibration difference signal and to evaluate amplitude of the vibration difference signal to determine if an anomaly has developed.

10. The apparatus of claim 9, further comprising a jet engine having a rotating part which serves as the rotor.

11. The apparatus of claim 10, further comprising an aircraft to which the jet engine is mounted.

12. The apparatus of claim 9, wherein the processor is further programmed to evaluate phase of the vibration difference signal by evaluating whether the phase remains consistent over successive vibration difference signals.

13. A method for measuring a mechanical anomaly comprising the steps of:
   a) rotating a mechanical component about an axis at a range of rotating speeds;
   b) generating a digital key phasor signal indicating a position of the rotating mechanical component relative to a reference point;
   c) generating a digital vibration signal indicating vibration of the rotating mechanical component; and
   d) detecting the digital vibration signal and digital key phasor signal and measuring phase of the digital vibration signal relative to the digital key phasor signal, the digital vibration signal being detected independent of acceleration or deceleration of the mechanical component.

14. A method as in claim 13 wherein the digital vibration signal is generated during acceleration of the rotating mechanical component.

15. A method as in claim 13 wherein the digital vibration signal is generated during deceleration of the rotating mechanical component.

16. A method as in claim 13 wherein the mechanical component is a rotor.

17. A method as in claim 13 further comprising the step of extracting a component of the vibration signal that has a frequency matching the frequency of rotation of the mechanical component for processing.

18. A method as in claim 13, wherein the vibration signal is a vibration vector, the vibration vector having an amplitude that indicates vibration amplitude, and a phase that indicates vibration angular position.

19. The method of claim 1, wherein the rotor is a flywheel.

20. The method of claim 1, wherein the rotor includes a disk and the amplitude of the vibration difference signal is evaluated to determine whether an anomaly in the disk has developed.

21. The apparatus of claim 9, wherein the processor is programmed to subtract the background vibration vector from the synchronous vibration signal, to produce a vibration difference signal and to evaluate amplitude of the vibration difference signal to determine if an anomaly in a disk of the rotor has developed.

* * * * *